United States Patent
Ganguli et al.

(10) Patent No.: US 10,025,686 B2
(45) Date of Patent: Jul. 17, 2018

(54) GENERATING AND COMMUNICATING PLATFORM EVENT DIGESTS FROM A PROCESSOR OF A SYSTEM

(71) Applicant: Intel Corporation, Santa Clara, CA (US)

(72) Inventors: Mrittika Ganguli, Bangalore (IN); Tessil Thomas, Bangalore (IN); Vinila Rose, Bangalore (IN); Hussam Mousa, Chandler, AZ (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1214 days.

(21) Appl. No.: 13/663,821

(22) Filed: Oct. 30, 2012

(65) Prior Publication Data
US 2014/0122834 A1 May 1, 2014

(51) Int. Cl.
*G06F 11/34* (2006.01)

(52) U.S. Cl.
CPC ........ *G06F 11/3433* (2013.01); *G06F 11/348* (2013.01); *G06F 2201/81* (2013.01); *G06F 2201/83* (2013.01); *G06F 2201/86* (2013.01); *G06F 2201/88* (2013.01); *G06F 2201/885* (2013.01)

(58) Field of Classification Search
CPC . G06F 11/348; G06F 11/3433; G06F 2201/88
See application file for complete search history.

(56) References Cited

U.S. PATENT DOCUMENTS

| | | | | |
|---|---|---|---|---|
| 6,105,142 A | * | 8/2000 | Goff | G06F 1/3203 713/320 |
| 7,003,698 B2 | * | 2/2006 | Glass | G06F 11/3656 714/30 |
| 7,051,215 B2 | * | 5/2006 | Zimmer | G06F 1/3203 713/300 |
| 7,770,034 B2 | * | 8/2010 | Nanja | 713/300 |
| 2004/0177143 A1 | * | 9/2004 | Maciel | H04L 12/2602 709/224 |
| 2005/0015624 A1 | * | 1/2005 | Ginter et al. | 713/201 |
| 2006/0031447 A1 | * | 2/2006 | Holt | H04L 12/24 709/223 |
| 2006/0037008 A1 | * | 2/2006 | Stelzer | G06F 17/5054 717/136 |

(Continued)

OTHER PUBLICATIONS

Shen et al., "Modern Processor Design," Oct. 2002, McGraw-Hill Co., Beta ed., pp. 28-30, 38.*

(Continued)

*Primary Examiner* — Yuqing Xiao
(74) *Attorney, Agent, or Firm* — Trop, Pruner & Hu, P.C.

(57) ABSTRACT

In an embodiment, a processor includes a plurality of counters each to provide a count of a performance metric of at least one core of the processor, a plurality of threshold registers each to store a threshold value with respect to a corresponding one of the plurality of counters, and an event logic to generate an event digest packet including a plurality of indicators each to indicate whether an event occurred based on a corresponding threshold value and a corresponding count value. Other embodiments are described and claimed.

21 Claims, 11 Drawing Sheets

(56) References Cited

U.S. PATENT DOCUMENTS

| | | | |
|---|---|---|---|
| 2006/0236155 A1* | 10/2006 | Lee | G06F 11/0748 714/31 |
| 2007/0043531 A1* | 2/2007 | Kosche | G06F 11/3447 702/182 |
| 2007/0088974 A1* | 4/2007 | Chandwani et al. | 714/6 |
| 2007/0294585 A1* | 12/2007 | Mandal | G06F 11/3648 714/38.13 |
| 2008/0040622 A1* | 2/2008 | Duran | G06F 1/3203 713/300 |
| 2008/0052585 A1* | 2/2008 | LaBerge et al. | 714/738 |
| 2008/0162972 A1* | 7/2008 | Liu | G06F 1/206 713/324 |
| 2008/0177756 A1* | 7/2008 | Kosche | G06F 11/3447 |
| 2009/0055665 A1* | 2/2009 | Maglione | G06F 1/206 713/320 |
| 2009/0164812 A1* | 6/2009 | Capps, Jr. | G06F 1/3203 713/320 |
| 2009/0235105 A1* | 9/2009 | Branover | G06F 1/3203 713/330 |
| 2010/0191936 A1* | 7/2010 | Khatri | G06F 1/3203 712/42 |
| 2011/0035611 A1* | 2/2011 | Brey | G06F 1/3203 713/320 |
| 2011/0088041 A1* | 4/2011 | Alameldeen | G06F 9/505 718/105 |
| 2011/0107115 A1* | 5/2011 | Verdun | G06F 1/3203 713/300 |
| 2011/0113199 A1* | 5/2011 | Tang et al. | 711/130 |
| 2011/0141936 A1* | 6/2011 | Utagawa | H04L 65/608 370/252 |
| 2011/0153928 A1* | 6/2011 | Avudaiyappan et al. | 711/109 |
| 2011/0246833 A1* | 10/2011 | Bockhaus | H04L 43/0847 714/37 |

OTHER PUBLICATIONS

Wikipedia page regarding Intelligent Platform Management Interface (IPMI), retrieved from WayBackMachine on Sep. 6, 2016, dated Oct. 3, 2011, 3 pages.*

John L. Hennessy & David A. Patterson, "Computer Architecture a Quantitative Approach," 4th Ed., 2007, pp. 195-201, 249-257.*

T. Brey, et al., "BladeCenter chassis management," Nov. 2005, IBM J. Res. & Dev., vol. 49, No. 6, pp. 941-961.*

U.S. Appl. No. 13/118,757, filed May 31, 2011, entitled, "Reducing Power Consumption of Uncore Circuitry of a Processor," by Srikanth Balasubramanian, et al.

* cited by examiner

GENERATING AND COMMUNICATING PLATFORM EVENT DIGESTS FROM A PROCESSOR OF A SYSTEM

BACKGROUND

Modern datacenter infrastructure is a distributed system with a large number of physical and logical objects. Behavior of these objects is managed automatically, governed by service level agreement (SLA)-driven and business-driven policies. The common goals are to reduce maintenance costs, to drive greater efficiencies for more flexibility, and to dynamically scale resource pools.

To enable accurate workload placement and overall management of the datacenter based on this physical hierarchy, multiple parameters of each server node are monitored. This information is used to categorize and rank servers for workload placement and movement. Typical solutions for obtaining this data require server node management software to set up counters to record/monitor the desired parameters, and then periodically interrupt the workload running on each node to read the set of performance and event monitor counters. However there are drawbacks including the effect on the workload by interrupting its operation. Further, as the number of cores per node and the number of nodes increases, the overhead of periodically reading and processing these counters becomes significant at the datacenter level. As such, the current counter read model for monitoring is not scalable. Also the counters used for monitoring are typically used by an operating system (OS)/application for performance monitoring/tuning/profiling as well. Since the OS/application has priority, the counters are often unavailable to the datacenter management software and due to delays via counter unavailability and the amount of data to be processed, inaccurate information may be used for decision making.

DETAILED DESCRIPTION

In various embodiments, information from a set of counters of a processor, e.g., of a performance monitoring unit (PMU) of the processor, may be obtained and communicated in an out-of-band (OOB) and operating system (OS)-transparent manner. More specifically, the processor may enable communication of this information to an external entity such as a datacenter manager or other external agent using out-of-band components of the processor and a system, e.g., a server of a datacenter, incorporating the processor. In this way, monitoring information regarding a large number of parameters of a core over a large number of cores of a processor and system node (and over a large number of such nodes) can be communicated in a scalable manner with reduced overhead. In addition, the counters used to monitor processor parameters may be at all times independent of OS/application usage of performance monitoring/profiling/tuning structures of the processor.

In general, a platform event digest may be generated according to a given time interval for a platform such as a server system and can be communicated via a sideband infrastructure to a datacenter manager or other entity. In an embodiment, the platform event digest may be a data packet including a digest segment per processor core of the platform. Although the scope of the present invention is not limited in this regard, the digest segment may include information regarding various parameters including, for example, socket bandwidth, memory controller bandwidth, thermal information, power information, and utilization information. Of course other monitoring information such as various performance monitoring or health information exposed by the processor and chipsets may also be included in other embodiments.

To enable data collection in an OS-transparent manner, embodiments may provide a set of threshold-based event monitor performance monitoring counters, associated events and event selection infrastructure, which is a shadow or logical copy of architecturally visible performance monitor/event infrastructure of the processor. However this logical copy is not visible to the operating system software. The programming and control of these counters can be done by an external entity via a sideband mechanism. This ensures that the entity always has accurate monitoring information independent of OS/application requirements.

Figure 1:
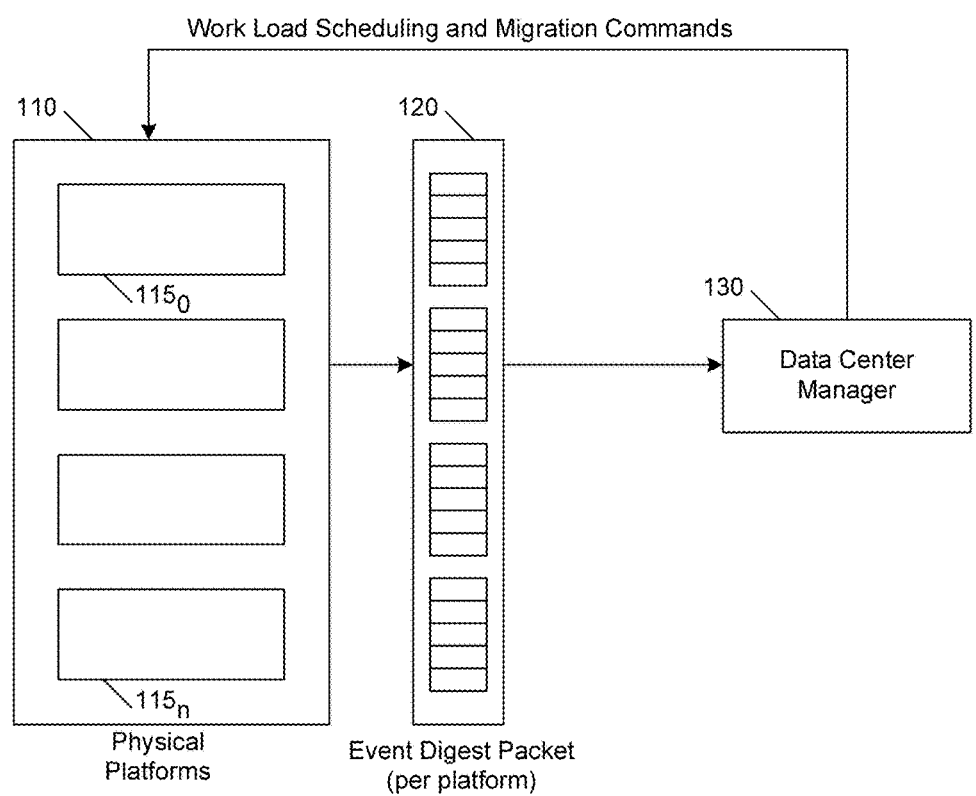
FIG. 1 is a block diagram of a high level view of a communication arrangement in accordance with an embodiment of the present invention.

Referring now to FIG. 1, shown is a block diagram of a high level view of a communication arrangement in accordance with an embodiment of the present invention. As shown in FIG. 1, a system 100 may include a monitored resource 110, which in an embodiment may correspond to a collection of hardware resources such as an entire datacenter infrastructure or one or more portions thereof. In the embodiment shown, monitored resource 110 may include a plurality of physical platforms 115$_0$-115$_n$, each of which may correspond to a physical node or server system, each a multicore server that is implemented in a server rack or other physical enclosure. Of course the scope of the present invention is not limited in this regard and the physical platforms can take many other forms such as other hardware of a datacenter or other multiprocessor networked environment. In general, each physical platform 115 may include one or more multicore processors that can generate and communicate events as described herein.

As seen in FIG. 1, each physical platform 115, according to some type of periodic or asynchronous interval, may generate an event digest packet 120 that can be communicated to a datacenter manager 130. In various embodiments, this datacenter manager may correspond to a master control manager software for the datacenter or other networked environment. Based at least in part on the information provided via these event digest packets, datacenter manager 130 may communicate instructions to cause various workloads to be scheduled and/or migrated between different physical platforms 115. Although shown at this high level in the embodiment of FIG. 1, understand that various other details and components are present in many embodiments.

Figure 2:
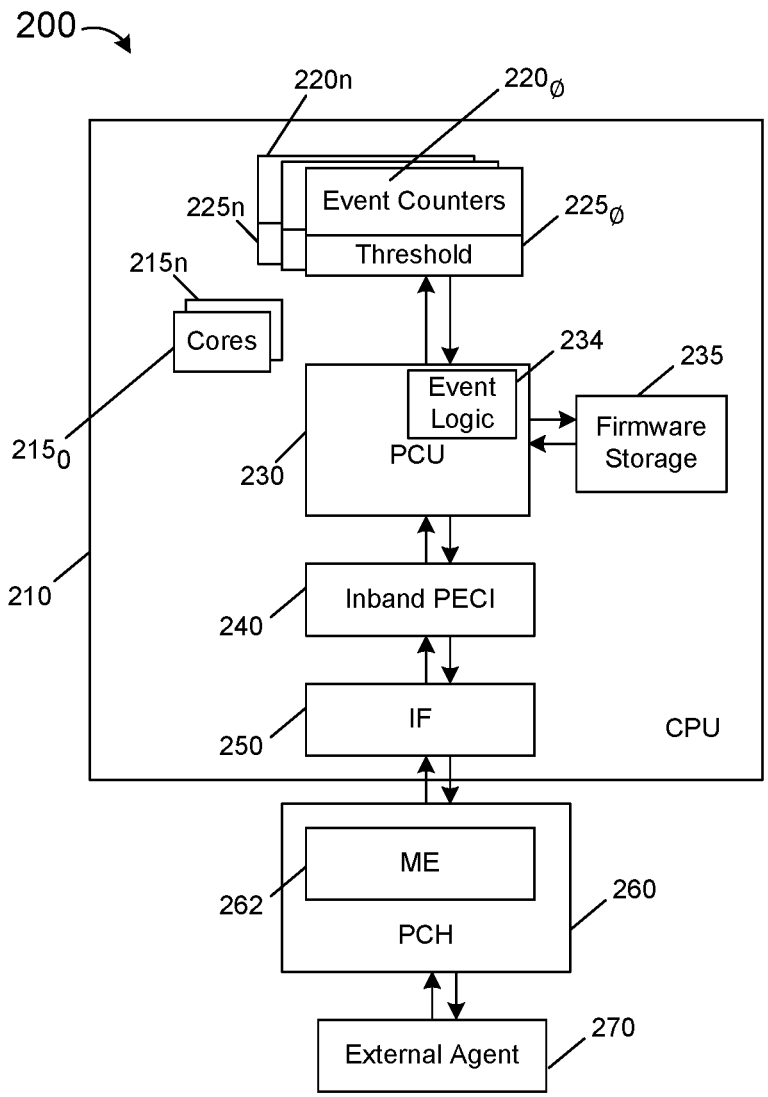
FIG. 2 is a block diagram of a portion of a server system in accordance with an embodiment of the present invention.

Referring now to FIG. 2, shown is a block diagram of a portion of a server system in accordance with an embodiment of the present invention. The portion of system 200 shown in FIG. 2 describes communication of monitored information from a processor 210 and through a chipset component to an external entity via an out of band channel.

As seen in FIG. 2, processor 210 may be a multicore processor including a plurality of cores $215_0$-$215_n$. Each of these cores may be a homogeneous core of a particular instruction set architecture (ISA) such as an out-of-order core. Or one or more of the cores may be of heterogeneous design such as a lower power in-order core. Of course in different embodiments various combinations of different types of computing elements may be present in a single processor (also referred to herein as a central processing unit (CPU)).

For purposes of illustration of the monitoring performed, shown are a plurality of event counters $220_0$-$220_n$. In various embodiments, these counters may be a set of performance counters available in a performance monitoring unit (PMU) of the processor. Although logically shown separate from the cores, in many embodiments at least some of the counters may be integrated within a PMU that instead is within a core (and note that each core may include its own PMU with corresponding counters (and threshold registers, discussed below). These counters are thus available to one or more OS's and/or applications executing on the processor. This event monitoring in accordance with an embodiment of the present invention can be performed in an OS/application transparent manner. To this end, a plurality of threshold registers $225_0$-$225_n$ may be present, each associated with a corresponding event counter. These threshold registers may store threshold values for the corresponding event counter to thus provide an ability to determine when a particular threshold value has been reached.

Note that both event counters 220 and threshold registers 225 may be in communication with a power control unit (PCU) 230, which may be a microcontroller-based agent of the processor that handles power management activities on behalf of an OS and performs OS transparent power management activities. In addition, PCU 230 may include an event logic 234 that may receive communications from event counters 220 and perform various processing on the received information to thus generate event packets as described herein. As further seen, instructions to be performed by PCU 230 may be received via a firmware storage 235, which in an embodiment may be a random access memory (RAM) to store firmware and/or other code for execution within PCU.

When event logic 234 generates a platform event digest in accordance with an embodiment of the present invention, such information may be communicated via a message channel link. Such packets may be communicated via an in-band platform environment control interface (PECI) 240 directly out of the processor, in some embodiments. This PECI is a single wire interface that enables communication of serial information to an external master such as a peripheral controller. While this interface is typically used for purposes of communication of thermal and/or other environmental information of the processor, embodiments may leverage this link to communicate event packets via a virtual channel on this link. In other embodiments (such as shown in FIG. 2), the platform event digest can be sent from PECI 240 and in turn through a link interface 250, which in an embodiment may be according to a given communication protocol such as a direct media interface (DMI) link or a Peripheral Component Interconnect Express (PCIe) link.

In either manner, these communications of event packets may be to a peripheral controller hub (PCH) 260. Although shown as a separate component (and thus as a separate integrated circuit (IC)) in the embodiment of FIG. 2, understand the scope of the present invention is not limited in this regard and in other embodiments a peripheral controller may be integrated within the same IC as processor 210. As seen, PCH 260 includes a manageability engine 262, which may perform various virtualization operations on behalf of the PCH and further can handle incoming event digest packets and prepare them for communication to an external agent 270. As one such example, the external agent may be a management entity of a rack including the platform, or it can be a high level datacenter manager software. This communication path may be via an out of band link such as a sideband channel, as the amount of information communicated between these devices may be of relatively limited size, and thus a minimal amount of bandwidth is needed for the communication.

Figure 3:
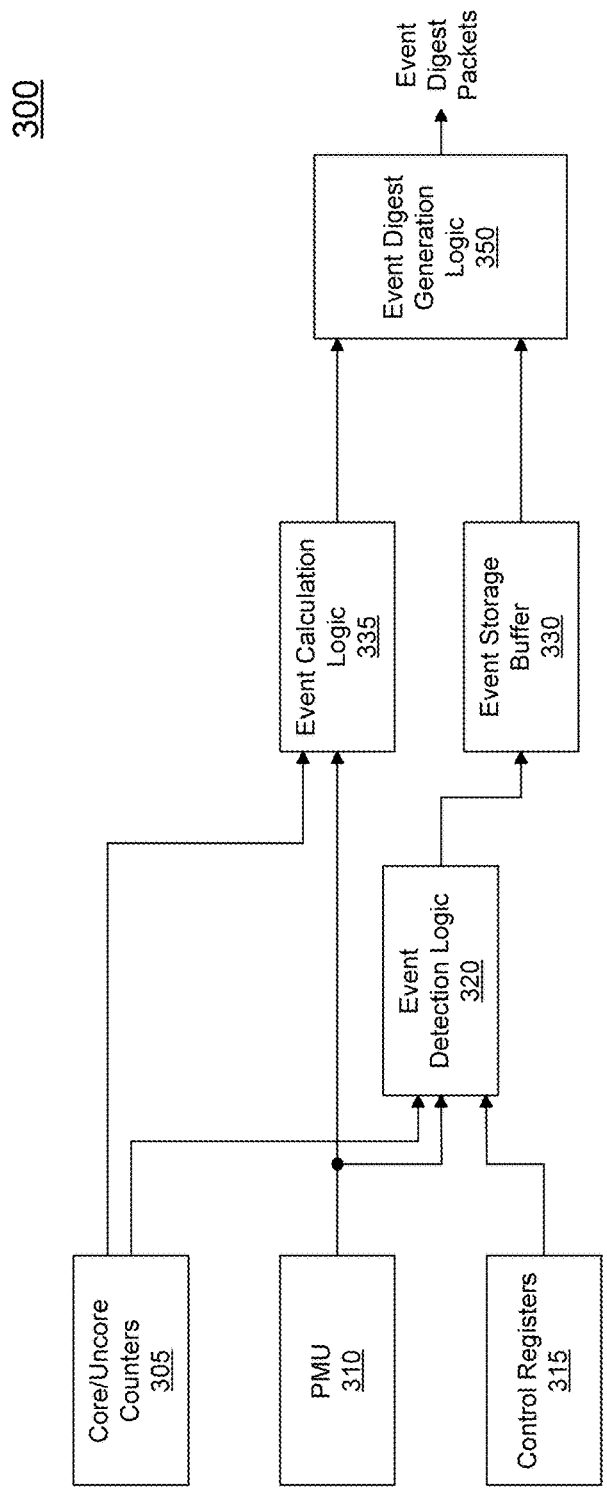
FIG. 3 is a block diagram of an event logic in accordance with an embodiment of the present invention.

Referring now to FIG. 3, shown is a block diagram of an event logic in accordance with an embodiment of the present invention. In one embodiment, event logic 300 may be implemented within a PCU of the processor. However understand the scope of the present invention is not limited in this regard and in other embodiments, the event logic may be located in other hardware, software and/or firmware of a processor. As seen, event logic may include or be coupled to receive information from various sources within a processor. In the embodiment shown, an event detection logic 320 may receive incoming information from a set of core/uncore counters 305, a PMU 310, and a set of control registers 315. In an embodiment, core/uncore counters 305 may include various counters within a core or uncore of a processor that are separate from the counters or other performance monitors of PMU 310. As an example, core/uncore counters 305 may include bandwidth counters for an interconnect of the processor among other such counters such as utilization, performance parameters like instructions per cycle, last level cache misses and so forth. In turn, PMU 310 may communicate information from a wide variety of counters that are available to the PMU. As some examples, such counters may include cache misses, instructions per cycle, among many other count types. In addition, event detection logic 320 may receive information from a set of control registers 315, which in an embodiment may include threshold information such as a corresponding threshold for at least some of the counters available in counters 305 and PMU 310. In an embodiment, these control registers 315 may be programmed via information received from an external entity such as a datacenter manager.

Still referring to FIG. 3, all of this information may be provided to event detection logic 320, which may act to generate events based on a given count value of one or more counters and corresponding one or more threshold values.

Details of such event generation will be described further below. As seen, these generated events can be provided to an event storage buffer 330.

In addition, an event calculation logic 335 may be provided to receive at least certain values from the core/uncore counters 305. Using event calculation logic 335, other events can be generated based on these counters, which correspond to either firmware-based counters or combined hardware/firmware-based counters, details of which are described further below.

Still referring to FIG. 3 in turn information from event calculation logic 335 and event storage buffer 330 can be provided to an event digest generation logic 350, which can thus generate a corresponding event digest packet for communication to an external entity via a sideband channel. Although shown at this high level in the embodiment of FIG. 3, understand the scope of the present invention is not limited in this regard.

A push model of counter overflow/underflow/threshold crossing information can enable interrupt delivery to an external entity via a sideband mechanism like PECI. These events are not reported/visible to the OS/applications at all. Instead all such events are collected within the event logic, and periodically an event digest is sent to the entity (or entities) via sideband channels such as PECI. In this way, all periodic polling/reading by the datacenter manager software is eliminated. As such, monitoring overhead is removed from the main band in terms of CPU utilization, reducing interface bandwidth utilization and datacenter manager software processing overhead as well.

In addition, in some embodiments a push model for delivering absolute values of certain parameters from the processor to the datacenter manager software can occur if desired. In such implementations, the periodicity of such updates may be programmable. For certain parameters/usage models, rather than an event reporting such as an event occurrence, the absolute value of a parameter may be delivered to the external entity. In some embodiments, such communication also may be via the sideband interface.

As described above, different implementations of an event digest are possible. In broadest terms, an event digest is a packet that provides information about which counters or other monitors (more generally monitor) of a predetermined set of monitors incurred an event within a time interval under analysis. In an embodiment, such event may be an overflow event, an underflow event, or a threshold crossing event, e.g., when a given monitor has crossed a predetermined threshold. As such, an event definition storage may be provided to enable programming of various controls of the events. In turn, a monitoring logic may, based on information in this storage, determine when a programmed event has occurred and update a corresponding event indicator of an event digest. Note that in some embodiments, there may be more than one threshold per counter.

The resulting event packet may include a plurality of indicator fields, such as a bit field (each of one or more bits) associated with each counter in the predetermined set of counters. The bits for each counter are used to encode information about the current status of that counter with respect to the pre-programmed event definition for the corresponding counter (e.g., a threshold crossing, overflow, or underflow event). In different embodiments, this event digest packet can be sent on a periodic (e.g., programmable) basis or whenever a certain number of counters have had an event (where the number of counters may be programmable).

The following examples illustrate some possibilities in creating the event digest; however understand the scope of the present invention is not limited to these illustrative examples. As one such example, each counter is allocated one bit. In other words, the counter bit field size in the event digest is 1.

Figure 4:
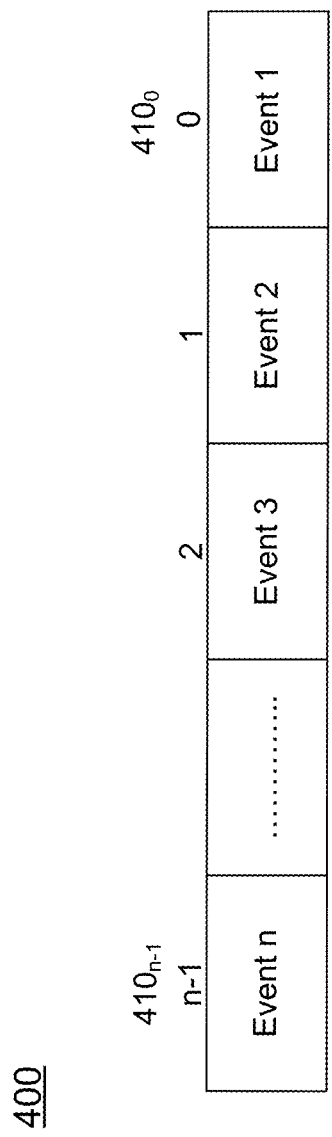
FIG. 4 is a block diagram of an event digest format in accordance with one embodiment of the present invention.

Referring now to FIG. 4, shown is a block diagram of an event digest format in accordance with one embodiment of the present invention. As shown in FIG. 4, event digest 400 may include a plurality of fields $410_0$-$410_{n-1}$. Each such field may correspond to a given event and in an embodiment may be a single bit field to thus indicate whether a given event has occurred. Based on programming, event occurrence can correspond to a counter overflow, a counter underflow, or a counter reaching a predetermined threshold level.

In another illustrative example an event digest format may be provided with multiple bits per event. In this example, each counter is allocated 2 bits such that the counter bit field size in the event digest is 2. These two bits can be used to indicate presence of a counter value within a given range of a programmed threshold. In other words, the event indicator may represent a location of a ratioed value within a given range (such as a quadrant in the example of a 2 bit indicator). More specifically in an embodiment, this ratio corresponds to a comparison of a current counter value to preprogrammed threshold value (counter value/threshold value). In an embodiment, a reporting mechanism may cause the event digest to be sent whenever there is a transition from one quadrant to another.

Table 1 below shows an example definition of event bits to ratio ranges in accordance with an embodiment of the present invention.

TABLE 1

| Event bits | Ratio |
|---|---|
| 00 | 0-.24 |
| 01 | .25-.49 |
| 10 | .50-.74 |
| 11 | .75-1 |

Figure 5:
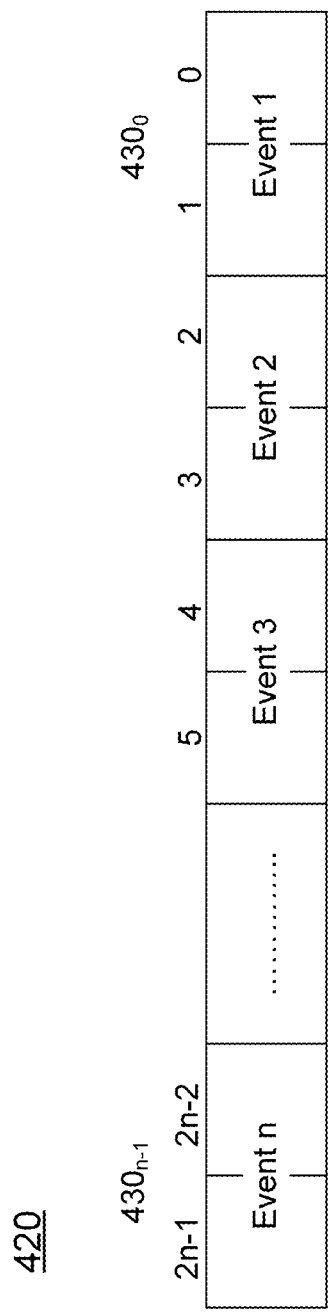
FIG. 5 is a block diagram of an event digest format in accordance with another embodiment of the present invention.

Referring now to FIG. 5, shown is a block diagram of an event digest format in accordance with another embodiment of the present invention. As shown in FIG. 5, event digest 420 may include a plurality of fields $430_0$-$430_{n-1}$. Each such field may correspond to a given counter or other monitor and in an embodiment may be two bit fields to thus indicate the quadrant in which the ratio is located. Of course, more bits per field may be provided to enable finer-grained information.

In different embodiments, there may be various methods for setting thresholds for the counters. As one such example, all thresholds can be initialized with a platform's theoretical limit multiplied by a factor, which may be a load target level, e.g., set by datacenter policy (e.g., a factor of 60% corresponding to a 60% load). This theoretical limit may be a per event calculation done a priori and can be maintained constant for a specific architectural generation of a processor and/or on a stock keeping unit (SKU) basis. As another example, thresholds may be controlled based on data from other sources. In this way, a workload top level performance can be used to fine tune the thresholds based on workload performance and event absolute values. As one such example, a threshold may be increased if acceptable performance is obtained despite counter saturations, or vice versa.

In various embodiments, different manners of generating threshold events may occur. For example, to measure core utilization, firmware of the core may keep track of the total time the core was active (e.g., in a C0 state in accordance with a given OS-based processor management protocol such as a given Advanced Configuration and Power Interface (ACPI) specification, e.g., Advanced Configuration and Power Interface Specification, revision 3.0b, Oct. 10, 2006) within a certain time interval. Assume that the corresponding threshold for this counter is programmed as C0 time during an analysis window (e.g., as measured in milliseconds for a window of 1 second). At the conclusion of an analysis window, the core firmware may calculate the C0 time within a 1 second sliding window. Or if the threshold is programmed as a fraction, the firmware may perform an appropriate operation to obtain the ratio, e.g., C0 time/time interval.

In other embodiments, a more CPU-light option may be provided. More specifically, an event may be reported whenever the C0 cycles counter reaches a preprogrammed threshold. From this reported event, the external entity can track the total elapsed time since the C0 cycles counter was started/enabled and then calculate the C0 time/total time.

As another example for generating a threshold event for bandwidth tracking, the total number of bytes transferred within a time interval can be tracked by processor firmware. Assume that the corresponding threshold is programmed as bytes transferred within a certain time window "T". Accordingly, the firmware tracks the number of bytes transferred within a sliding window "T". In another embodiment, for a more CPU-light option an event is reported whenever the bytes transferred counter hits a programmed threshold. From this reported event, the external entity can track the total elapsed time since the bandwidth counter was started/enabled and calculate the bytes transferred/total time.

Note that the partitioning decision as to handling more of the processing in the processor versus datacenter manager or other external entity may depend on the complexity-vs-accuracy-vs-scalability tradeoff. Doing more processing in the processor improves scalability and accuracy, while increasing processor complexity.

In some embodiments, note that the counters, which may be hardware counters, are distributed in various units of the processor. In an embodiment the threshold values may be stored into a set of configuration registers or other storage of the processor such as a set of threshold registers. In an embodiment logic within the PCU may be used to execute firmware for performing event processing for hardware counters, event generation for firmware and hardware counters, and event digest packet generation.

For hardware based counting, appropriate counter logic, counter increment/decrement trigger logic, and counter programming/increment decrement trigger selection logic can be implemented, e.g., within a PMU or other logic of a processor. For these counters, control may be based on threshold values stored in a corresponding threshold register, which can be programmed by the datacenter manager. In an embodiment, event detection for such counters may occur by providing a threshold and counter value from the corresponding counter to a comparator. The crossing of the threshold will result in an event signal which is sent to the PCU for eventual incorporation into an event digest packet. In many embodiments, these counters may include available performance counters present within a PMU or other processor logic (although the accessing and use of data from such counters are not visible to OS or other system software). In general, these counters may be referred to herein as "hardware counters." Examples of such counters include instructions retired, unhalted clock cycles, among others.

For events that implement firmware-based counting, the appropriate counter logic, counter increment/decrement trigger logic, and counter programming/increment decrement trigger selection logic can be implemented in firmware. Such counters may be referred to herein as "firmware counters."

Still other parameters can be counted using one or more hardware counters, and be further processed in firmware for generating a final event to be incorporated into the event digest packet. Such parameters will use the same hardware counter resources and PCU firmware logic described above and may be referred to herein as "hardware+firmware counters."

Note that where an output is to be more than 1 bit per counter in the event digest, firmware counting/event generation or firmware and hardware combined counting/event generation may be used.

Figure 6:
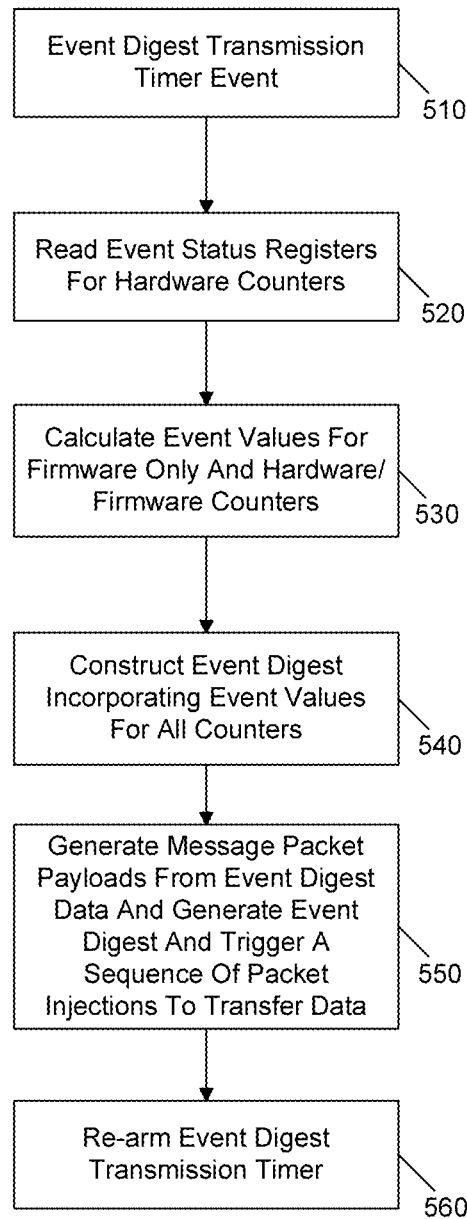
FIG. 6 is a flow diagram of a method for generating and communicating an event digest format in accordance with an embodiment of the present invention.

FIG. 6 is a flow diagram of a method for generating and communicating an event digest format for the three types of events in accordance with an embodiment of the present invention. As seen in FIG. 6, method 500 may be implemented, e.g., in a power controller or other controller within a processor to thus enable the receipt and processing of counter information into events, and the generation of an event digest packet for transmission. As seen, method 500 may begin by the occurrence of an event digest transmission timer event (block 510). In an embodiment, event digest logic may be configured to obtain counter and other monitoring information according to a predetermined interval and generate periodic event digest packets for transmission. When such timer expires, control then passes to block 520 where event status registers can be read for hardware counters. These event status registers may be of a buffer, queue or other temporary storage that receives indications of an event occurring for a particular type of counter or other monitor. For example, these storages can be populated when a counter experiences an overflow or underflow event, or crosses a predetermined threshold. Note that the amount of such counters to be monitored may be programmable, e.g., by an external entity.

Still referring to FIG. 6, instead for firmware-based counters or combined hardware and firmware counters, event values can be calculated (block 530). Again note that the number of such counters to be enabled can also be programmed. In general, various counter logic, trigger logic and so forth can be implemented in the PCU to thus calculate these events responsive to code, e.g., firmware.

Next control passes to block 540 where event digest data can be constructed incorporating event values for the different types of counters (block 540). From this data, one or more message packet payloads can be generated (block 550). Furthermore, a sequence of one or more register access vendor defined messages (RAVDM) can be communicated to transfer the information from the processor. In an embodiment, these messages can be communicated to a manageability engine of a peripheral controller coupled to the processor. Finally, at block 560 the event digest transmission timer can be re-armed to enable a next analysis interval to occur. Although shown at this high level in the embodiment of FIG. 6, understand the scope of the present invention is not limited in this regard.

Figure 7:
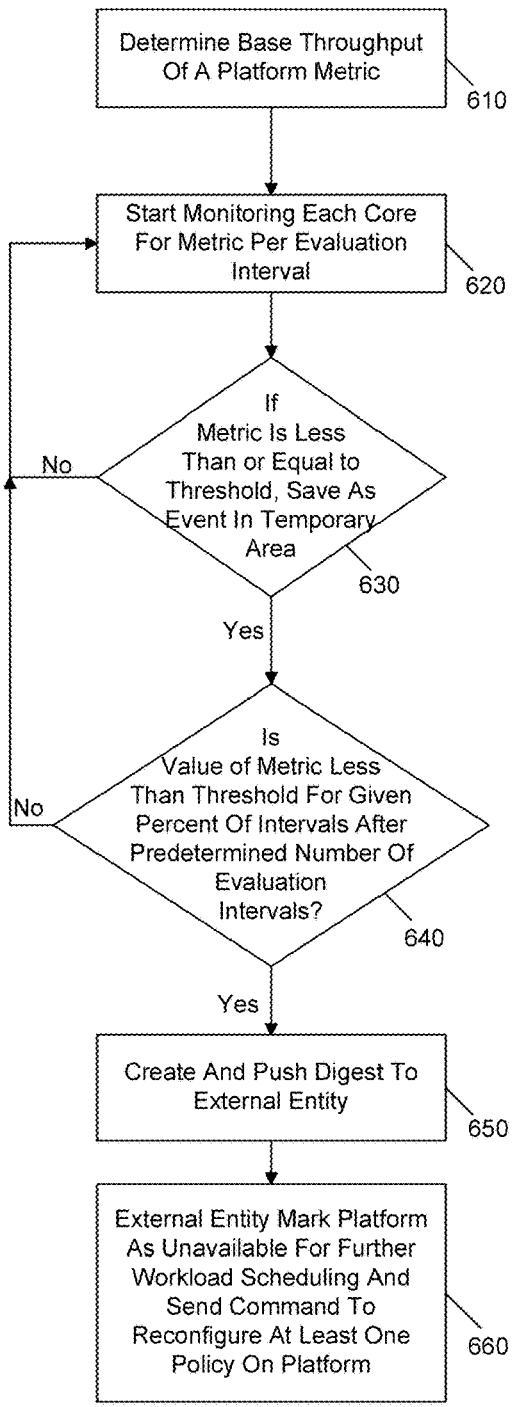
FIG. 7 is a flow diagram of a method for push-based communication of an event and operations performed responsive to this event in accordance with an embodiment of the present invention.

Referring now to FIG. 7, shown is a flow diagram of a push-based communication of an event and operations performed responsive to this event. Assume that the event at issue here relates to a particular performance metric under analysis, namely a number of instructions per cycle (IPC). This information can be obtained from a performance counter of a PMU. As seen, method 600 may begin at block 610 by determining a base throughput of a platform for the metric, e.g., in terms of instructions per cycle. Assume for purposes of discussion that the base throughput is an IPC of 30. Control next passes to block 620 where during an evaluation interval, which in an embodiment may be programmable and corresponds to one second, each core may be monitored for IPC, e.g., via its corresponding PMU counter. Control then passes to diamond 630 to determine whether the IPC is less than a threshold. Although the scope of the present invention is not limited in this regard, in one embodiment this threshold may be at a standard deviation lower than the base value. For example with a base value of 30, the standard deviation threshold value may be set at 15. If the instructions per cycle is lower than this threshold value, an event may be saved in a temporary area such as a temporary register of the processor.

Next, control passes to diamond 640 where it can be determined whether less than threshold percentage of a given number of evaluation intervals (e.g., 100) is below this threshold value. If so, control passes to block 650 where an event digest can be created and pushed to one or more external entities. Although the scope of the present invention is not limited in this regard, such entities may include a cloud workload scheduler database and remote monitoring software such as a datacenter manager. Control next passes to block 660 where the external entity may mark at least the platform as unavailable for further workload scheduling. In some embodiments, an entire server row may be so marked. In addition, a command can be sent to reconfigure at least one policy on the platform, e.g., to improve its throughput or to otherwise improve its performance. For example, the datacenter manager may send a command to update a policy of one or more hardware components of the processor. As one such example, a cache quality of service (QoS) policy can be updated to enable only workloads having a particularly high QoS level to be cacheable, to thus attempt to improve throughput of the processor. Of course many other types of policy decisions can be made and communicated to a processor. As one such example a workload can be run on a processor with available utilization according to a utilization policy using available power according to a power policy. Although shown at this high level in FIG. 7, understand the scope of the present invention is not limited in this regard.

Thus in various embodiments, a set of thresholds may be programmed to enable a processor to obtain and send performance indications each as an event, e.g., via a push based mechanism, to an external entity such as a cloud monitoring solution. In this way, the need for the external agent to actively call a PMU monitoring solution can be avoided. Still further via embodiments described herein, performance monitoring can be done in an OOB manner, and event information can be communicated with a limited amount of bandwidth. As one such example, an event digest of two bytes or less can be generated for a selected set of counters (e.g., 16 or fewer selected counters), providing a dramatic reduction in the amount of data to be communicated.

Figure 8:
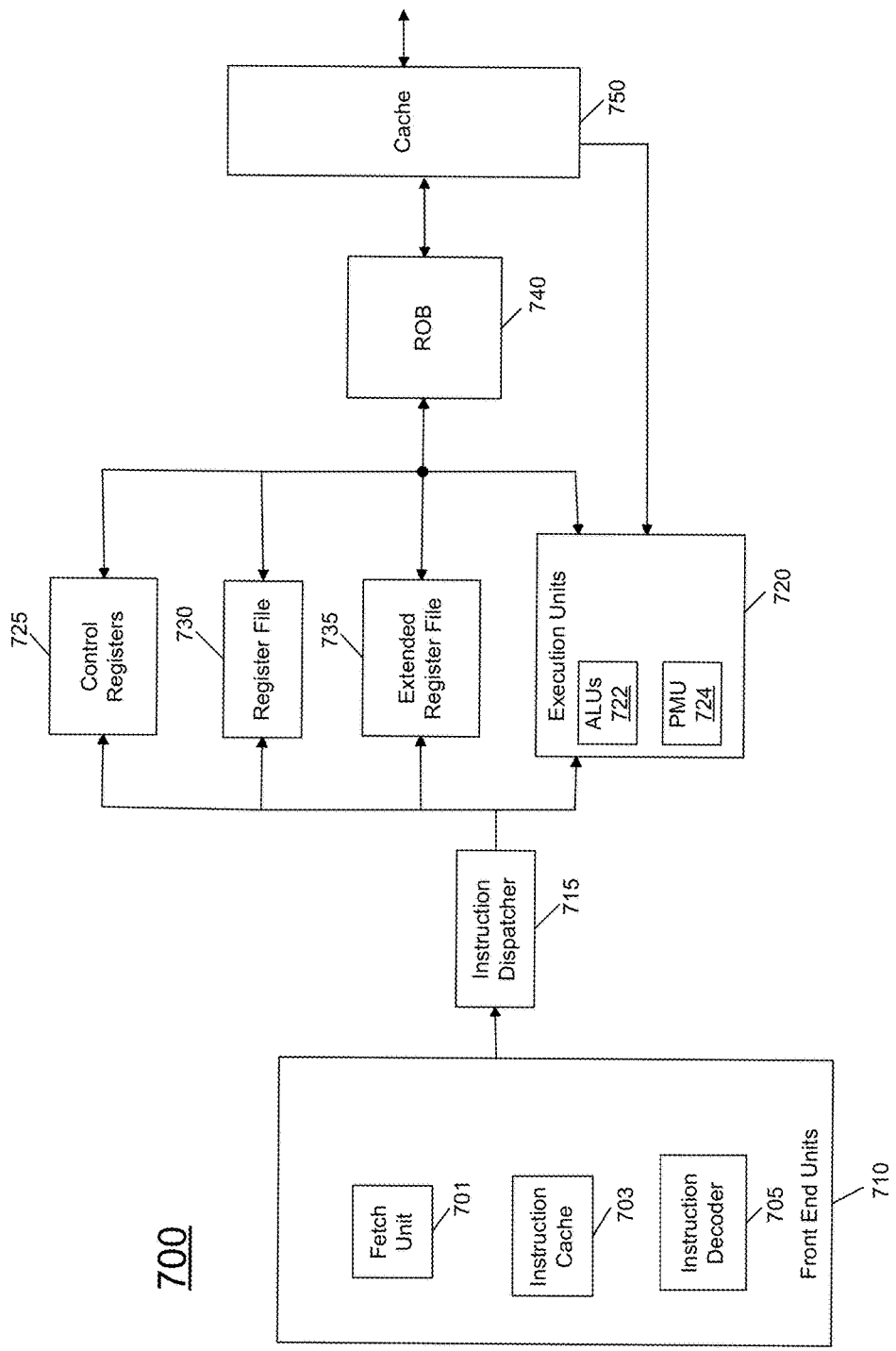
FIG. 8 is a block diagram of a processor core in accordance with one embodiment of the present invention.

Referring now to FIG. 8, shown is a block diagram of a processor core in accordance with one embodiment of the present invention. As shown in FIG. 8, processor core 700 may be a multi-stage pipelined out-of-order processor. Processor core 700 is shown with a relatively simplified view in FIG. 8. As shown in FIG. 8, core 700 includes front end units 710, which may be used to fetch instructions to be executed and prepare them for use later in the processor. For example, front end units 710 may include a fetch unit 701, an instruction cache 703, and an instruction decoder 705. In some implementations, front end units 710 may further include a trace cache, along with microcode storage as well as a micro-operation storage. Fetch unit 701 may fetch macro-instructions, e.g., from memory or instruction cache 703, and feed them to instruction decoder 705 to decode them into primitives, i.e., micro-operations for execution by the processor.

Coupled between front end units 710 and execution units 720 is an instruction dispatcher 715 which can be implemented as out-of-order logic in out-of-order implementations to receive the micro-instructions and prepare them for execution. More specifically instruction dispatcher 715 may include various buffers to allocate various resources needed for execution, as well as to provide renaming of logical registers onto storage locations within various register files such as register file 730 and extended register file 735. Register file 730 may include separate register files for integer and floating point operations. Extended register file 735 may provide storage for vector-sized units, e.g., 256 or 512 bits per register. As further seen in FIG. 8, processor 700 may include a set of control registers 725. Various types of threshold information received from an external entity may be stored in such registers.

Various resources may be present in execution units 720, including, for example, various integer, floating point, and single instruction multiple data (SIMD) logic units, among other specialized hardware. For example, such execution units may include one or more arithmetic logic units (ALUs) 722. In addition, execution units may further include a performance monitoring unit (PMU) 724. In various embodiments, PMU 724 may be used to control obtaining of various information, e.g., profiling counters, performance counters and so forth. In particular implementations here, PMU 724 or other such logic may be used to provide processor utilization information that can be processed by event logic as described herein.

Results of execution in the execution units may be provided to retirement logic, namely a reorder buffer (ROB) 740. More specifically, ROB 740 may include various arrays and logic to receive information associated with instructions that are executed. This information is then examined by ROB 740 to determine whether the instructions can be validly retired and result data committed to the architectural state of the processor, or whether one or more exceptions occurred that prevent a proper retirement of the instructions. Of course, ROB 440 may handle other operations associated with retirement.

As shown in FIG. 8, ROB 740 is coupled to a cache 750 which, in one embodiment may be a low level cache (e.g., an L1 cache) although the scope of the present invention is not limited in this regard. Also, execution units 720 can be directly coupled to cache 750. While shown with this high level in the embodiment of FIG. 8, understand the scope of the present invention is not limited in this regard.

Figure 9:
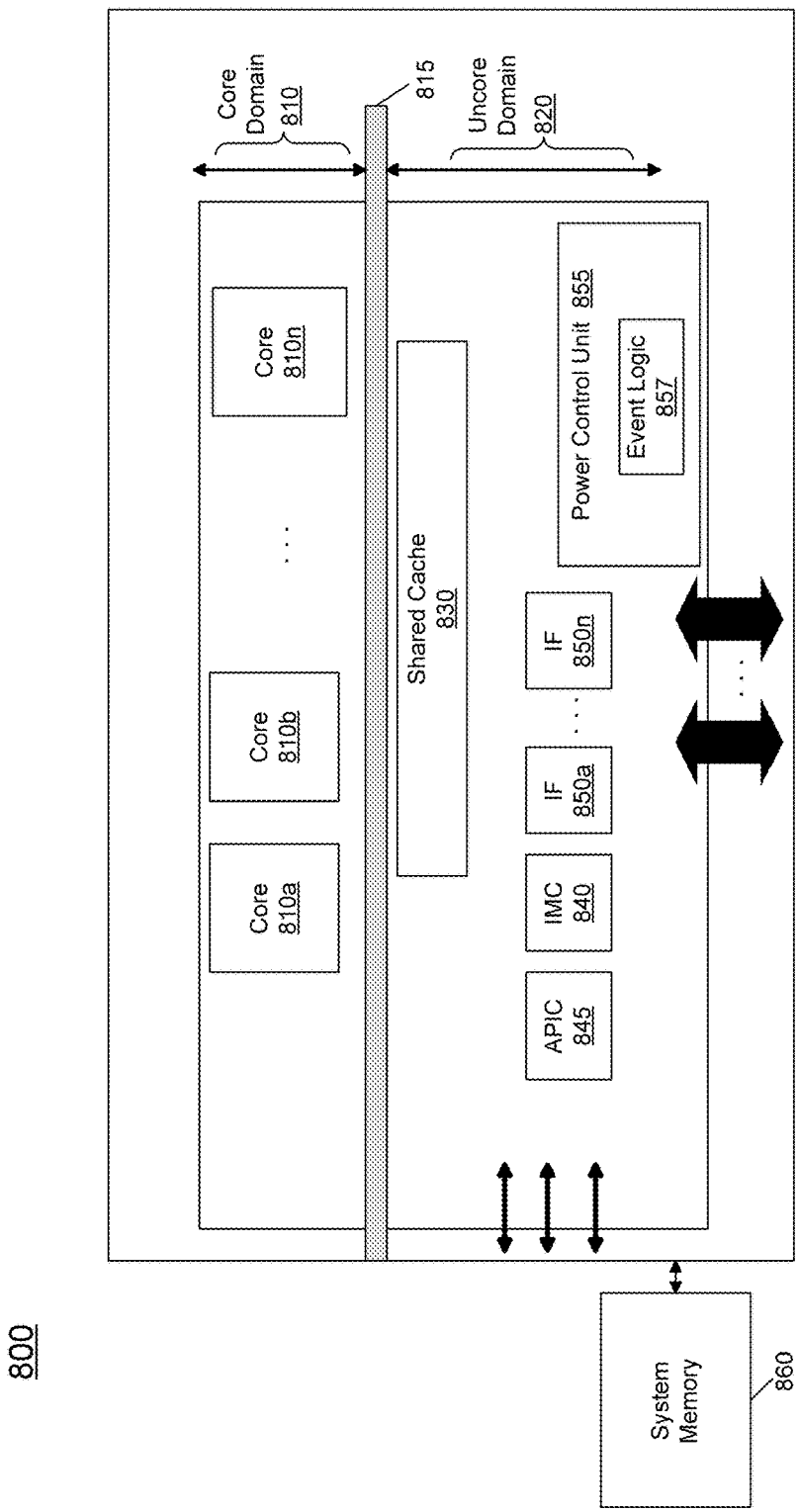
FIG. 9 is a block diagram of a processor in accordance with an embodiment of the present invention.

Referring now to FIG. 9, shown is a block diagram of a processor in accordance with an embodiment of the present invention. As shown in FIG. 9, processor 800 may be a multicore processor including a plurality of cores 810a-810n in a core domain 810. In one embodiment, each such core may be of an independent power domain and can be configured to operate at an independent voltage and/or frequency, and to enter turbo mode when available headroom exists, or the cores can be uniformly controlled as a single domain. The cores may be coupled via an interconnect 815 to a system agent or uncore 820 that includes various components. As seen, the uncore 820 may include a shared cache 830 which may be a last level cache. In addition, the uncore may include an integrated memory controller 840, various interfaces 850, an advanced programmable interrupt controller (APIC) 845, and a power control unit (PCU) 855 to control power consumption by the components of the processor. In the embodiment shown, PCU 855 includes an event logic 857 to receive configuration information and performance information and generate event digest packets for reporting as described herein.

With further reference to FIG. 9, processor 800 may communicate with a system memory 860, e.g., via a memory bus. In addition, by interfaces 850, connection can be made to various off-chip components such as peripheral devices, mass storage and so forth. While shown with this particular implementation in the embodiment of FIG. 9, the scope of the present invention is not limited in this regard.

Figure 10:
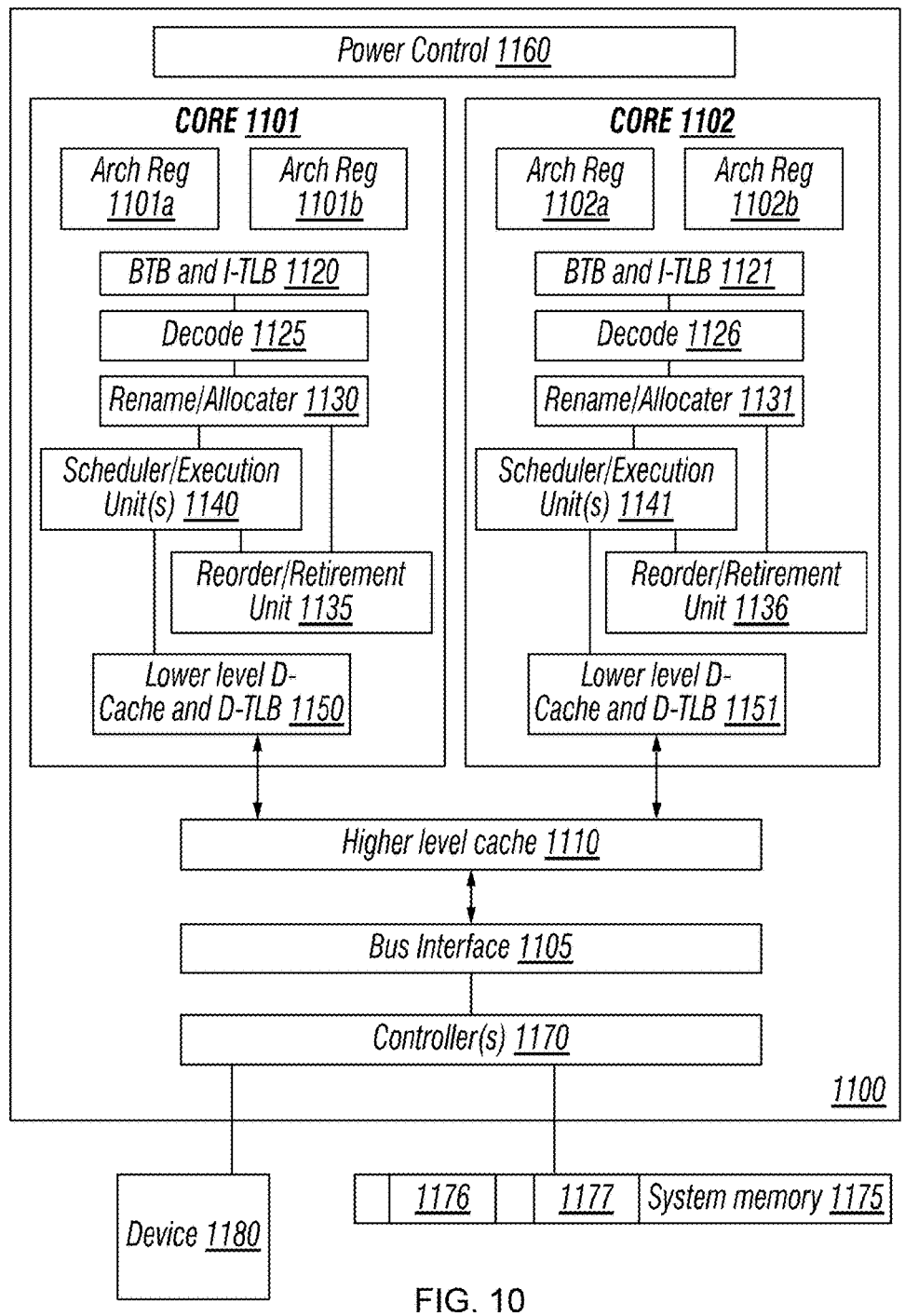
FIG. 10 is a block diagram of an embodiment of a processor including multiple cores.

Referring to FIG. 10, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 10, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, I-TLB 1120, load/store buffers, and queues may be shared through partitioning. Other resources, such as general purpose internal registers, page-table base register(s), low-level data-cache and D-TLB 1150, execution unit(s) 1140, and portions of reorder/retirement unit 1135 are potentially fully shared.

Processor 1100 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform the event monitoring and event digest packet generation in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 11:
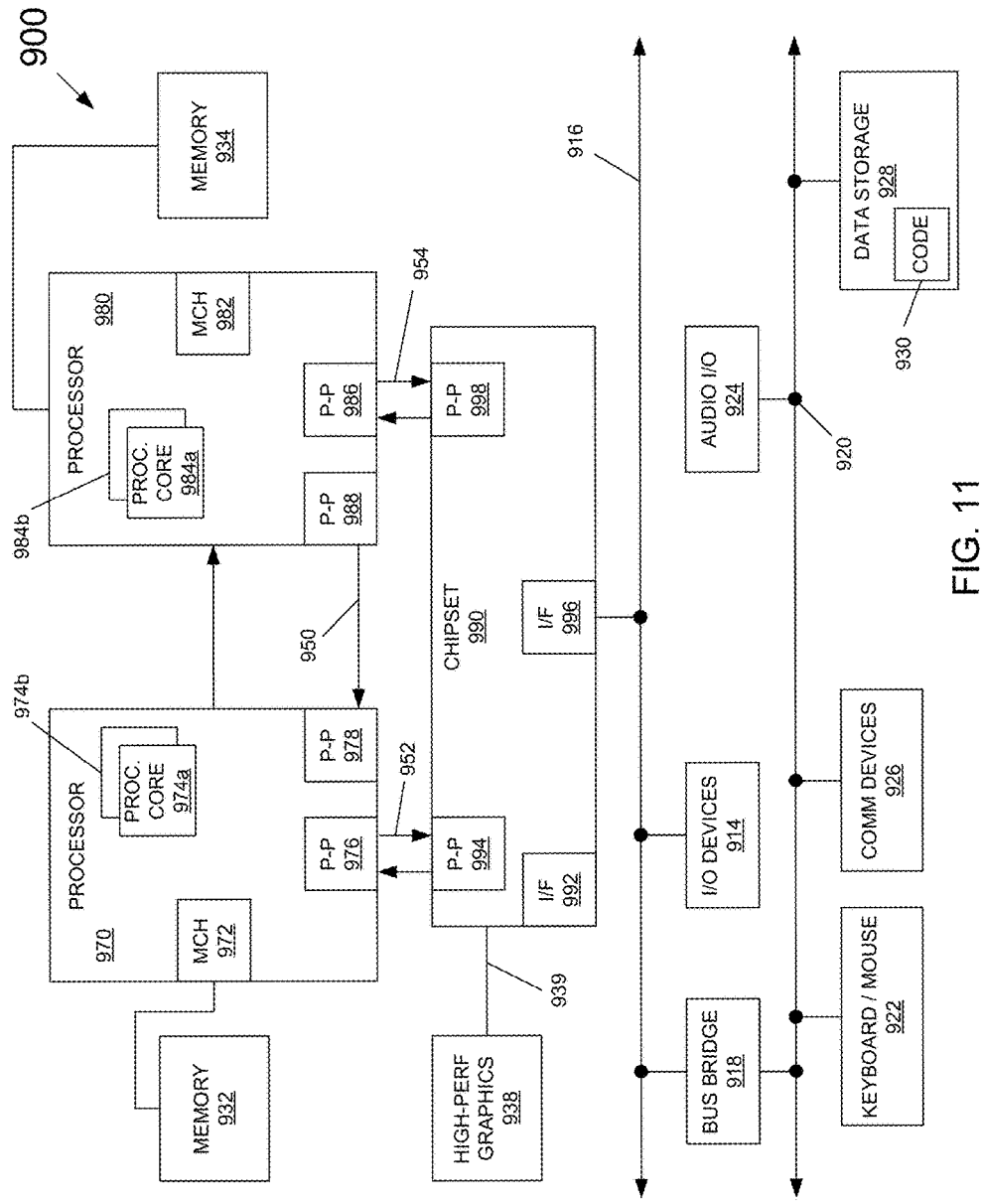
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 900 is a point-to-point interconnect system, and includes a first processor 970 and a second processor 980 coupled via a point-to-point interconnect 950. As shown in FIG. 11, each of processors 970 and 980 may be multicore processors, including first and second processor cores (i.e., processor cores 974a and 974b and processor cores 984a and 984b), although potentially many more cores may be present in the processors. Each of the processors can include event logic to receive monitoring information and generate event digest packets for communication to an external entity, as described herein.

Still referring to FIG. 11, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 11, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 952 and 954, respectively. As shown in FIG. 11, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. As shown in FIG. 11, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of processor cores each comprising a pipelined processor;
a plurality of metric counters each to provide a count value of a performance metric of at least one processor core of the plurality of processor cores, the plurality of metric counters comprising a first metric counter to provide a cache misses metric;
a plurality of count threshold registers each to store a count threshold value with respect to a corresponding one of the plurality of metric counters, the plurality of metric counters and the plurality of count threshold registers to not be visible to an operating system executing on the processor; and
an internal power control unit (PCU) to manage power consumption in the processor transparently to the operating system executing on the processor, the internal PCU further to generate an event digest packet using the plurality of metric counters and the plurality of count threshold registers, the event digest packet including a plurality of indicators corresponding to a plurality of events, each indicator to uniquely indicate whether a corresponding event occurred based on a corresponding count threshold value and a corresponding count value, the event digest packet not including the corresponding count threshold value and the corresponding count value, the internal PCU further to communicate the event digest packet to a datacenter manager via a sideband interface transparently to the operating system executing on the processor.

2. The processor of claim 1, wherein each of the plurality of indicators in the event digest packet is to indicate whether the count value of a corresponding metric counter overflowed, underflowed, or crossed a corresponding threshold value.

3. The processor of claim 1, wherein the internal PCU is to communicate the event digest packet to the datacenter manager via a manageability engine of a peripheral controller, wherein the peripheral controller is coupled to the processor via a platform environment control interface.

4. The processor of claim 1, wherein the internal PCU comprises a microcontroller to execute firmware instructions stored within the processor, wherein execution of the firmware instructions is not visible to the operating system executing on the processor.

5. The processor of claim 1, wherein the internal PCU is to enable communication of the event digest packet to the datacenter manager at a periodic interval, without polling by the datacenter manager.

6. The processor of claim 1, wherein the internal PCU is to enable communication of the event digest packet to the datacenter manager when a value of one of the plurality of indicators has changed.

7. The processor of claim 1, wherein the plurality of count threshold registers are programmable responsive to programming information received from the datacenter manager.

8. The processor of claim 1, wherein each indicator in the event digest packet consists of two bits that represent a ratio of the count value of corresponding counter with respect to the corresponding count threshold value.

9. The processor of claim 8, wherein the ratio representation corresponds to a presence of the ratio within a range of ratio values.

10. The processor of claim 1, wherein the sideband interface comprises a single wire interface.

11. The processor of claim 1, further comprising an internal performance monitoring unit (PMU) of the processor, the internal PMU including a set of PMU metric counters, wherein the set of PMU metric counters are accessible to the operating system executing on the processor.

12. The processor of claim 1, wherein the internal PCU is to:
receive the count values from at least some of the plurality of metric counters and the count threshold values from at least some of the plurality of count threshold registers;
generate at least one indicator responsive to detection of an event;
provide the at least one indicator to an event storage;
receive a count value from a first metric counter of the plurality of metric counters;
calculate an event responsive to the count value;
generate the event digest packet based on the at least one indicator from the event storage and the calculated event.

13. The processor of claim 1, the plurality of metric counters comprising a set of hardware metric counters and a set of firmware metric counters, the plurality of counter threshold registers to store threshold values for the set of hardware metric counters, and the set of firmware metric counters transparently to the operating system executing on the processor.

14. A system comprising:
a plurality of servers each having a multicore processor, wherein each multicore processor includes:
a plurality of cores,
a plurality of metric counters each to provide a count value of a performance metric of at least one core,
a plurality of count threshold registers each to store a count threshold value with respect to a corresponding one of the plurality of metric counters, the plurality of metric counters and the plurality of count threshold registers to not be visible to an operating system executing on the multicore processor, and an internal power control unit (PCU) to manage power consumption in the multicore processor transparently to the operating system executing on the multicore processor, the internal PCU further to generate an event digest packet using the plurality of metric counters and the plurality of count threshold registers, the event digest packet including a plurality of indicators corresponding to a plurality of events, each indicator to uniquely indicate whether a corresponding event occurred based on a corresponding count threshold value and a corresponding count value, the event digest packet not including the corresponding count values, the internal PCU further to communicate the event digest packet to a datacenter manager via a sideband interface transparently to the operating system executing on the multicore processor; and a datacenter manager remotely coupled to the plurality of servers to receive the event data packet via a sideband channel from each of the plurality of servers, wherein the datacenter manager is to communicate a command to at least one of the plurality of servers to update a policy for a hardware component of the at least one server.

15. The system of claim 14, wherein the internal PCU is to communicate the event digest packet to the datacenter manager via a manageability engine of a peripheral controller, wherein the peripheral controller is coupled to the processor via a platform environment control interface.

16. The system of claim 14, wherein each indicator in the event digest packet comprises two bits to indicate a value based on a ratio of the corresponding count value to the corresponding count threshold value, wherein the two bits indicate a presence of the ratio within a range of ratio values.

17. The system of claim 16, wherein the internal PCU comprises a microcontroller to execute firmware instructions stored within the processor, wherein execution of the firmware instructions is not visible to the operating system executing on the processor.

18. The system of claim 14, wherein each multicore processor includes an internal performance monitoring unit (PMU), the internal PMU including a set of PMU metric counters.

19. The system of claim 14, the plurality of metric counters comprising at least one metric counter to provide an interface bandwidth utilization metric.

20. The system of claim 14, the plurality of metric counters comprising metric counters to provide a cache misses metric and an instructions per cycle metric.

21. The system of claim 14, the plurality of metric counters comprising a set of hardware metric counters and a set of firmware metric counters, the plurality of counter threshold registers to store threshold values for the set of hardware metric counters, and the set of firmware metric counters transparently to the operating system executing on the processor.

* * * * *